(12) United States Patent
Nishino (10) Patent No.: US 10,891,090 B2
(45) Date of Patent: Jan. 12, 2021

(54) IMAGE FORMING SYSTEM

(71) Applicant: KYOCERA Document Solutions Inc., Osaka (JP)

(72) Inventor: Tetsuya Nishino, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/726,393

(22) Filed: Dec. 24, 2019

(65) Prior Publication Data
US 2020/0225892 A1   Jul. 16, 2020

(30) Foreign Application Priority Data

Jan. 10, 2019   (JP) ................................. 2019-002999

(51) Int. Cl.
*G06F 3/12* (2006.01)
*H04N 1/34* (2006.01)

(52) U.S. Cl.
CPC .......... *G06F 3/1238* (2013.01); *G06F 3/1292* (2013.01); *H04N 1/346* (2013.01)

(58) Field of Classification Search
CPC ..... G06F 3/1238; G06F 3/1292; H04N 1/346; H04N 2201/0094; H04N 1/34
See application file for complete search history.

(56) References Cited

U.S. PATENT DOCUMENTS

| | | | | |
|---|---|---|---|---|
| 2009/0180141 A1* | 7/2009 | Takaishi | ................ | G06F 3/1288 358/1.15 |
| 2010/0079785 A1* | 4/2010 | Emori | ..................... | H04L 67/12 358/1.14 |
| 2012/0147420 A1* | 6/2012 | Nishimi | ................ | G06F 3/1204 358/1.15 |
| 2014/0320883 A1* | 10/2014 | Ichida | ................... | G06F 3/1222 358/1.14 |
| 2014/0335903 A1* | 11/2014 | Takeuchi | ............ | H04L 63/0407 455/461 |

(Continued)

FOREIGN PATENT DOCUMENTS

JP   2003-050691   2/2003

OTHER PUBLICATIONS

EPO, Supplementary European Search Report of Application No. 20150164.0 dated May 19, 2020.

*Primary Examiner* — Ted W Barnes
(74) *Attorney, Agent, or Firm* — Lex IP Meister, PLLC (57) ABSTRACT

An image forming system includes an image forming apparatus, a management terminal device, and a mobile terminal device. The mobile terminal device downloads and installs an application program, presents identification information to the management terminal device, and accepts a temporal ID. The management terminal device, upon accepting the identification information from the mobile terminal device, generates the temporal ID, presents the temporal ID to the mobile terminal device, and transmits the temporal ID to a user authentication device to register the temporal ID as a user ID of the guest user. When payment of a usage fee for the image forming apparatus by the guest user is completed, the management terminal device deletes registration of the temporal ID. The image forming apparatus performs user authentication when the guest user logs in to the image forming apparatus, and issues an invoice when the guest user logs out.

7 Claims, 7 Drawing Sheets

(56) References Cited

U.S. PATENT DOCUMENTS

| | | | | |
|---|---|---|---|---|
| 2015/0002884 A1* | 1/2015 | Okumura | .............. | G06F 3/1268 358/1.14 |
| 2015/0015908 A1* | 1/2015 | Tanaka | ................. | H04N 1/4413 358/1.14 |
| 2016/0124689 A1* | 5/2016 | Nishino | ................ | G06F 3/1238 358/1.14 |
| 2016/0295037 A1* | 10/2016 | Kawai | ................. | H04L 63/0846 |
| 2017/0230536 A1* | 8/2017 | Haapanen | ............ | H04N 1/4413 |
| 2018/0212950 A1* | 7/2018 | Nogawa | ............ | H04N 1/00244 |
| 2019/0098476 A1* | 3/2019 | Takeishi | ................ | G06F 3/1204 |

* cited by examiner

IMAGE FORMING SYSTEM

INCORPORATION BY REFERENCE

This application is based upon and claims the benefit of priority from the corresponding Japanese Patent Application No. 2019-002999 filed on Jan. 10, 2019, the entire contents of which are incorporated herein by reference.

BACKGROUND

The present disclosure relates to an image forming system.

Some system determines whether print data is for public use or private use when printing is executed by an image forming apparatus installed in a company, school or the like, and when it is determined that the print data is for private use, charges a printing cost based on the print data to a user of the print data.

However, in the above-described system, since the user needs to be specified in order to charge for private printing, the user to be charged must be registered in advance. Therefore, for example, when a guest visiting a customer site such as an office temporarily uses an image forming apparatus installed at the customer site, it is difficult to charge a cost generated by a guest using the image forming apparatus to the guest individually and reliably because the guest is not individually registered as a user in the system. For example, when a guest account is charged for a cost generated by using the image forming apparatus under the guest account, if a plurality of guests use one guest account, the cost of a plurality of guests is charged to one guest account.

The present disclosure has been made in view of the above problems, and an object of the disclosure is to provide an image forming system in which a guest user who uses an image forming apparatus installed at a customer site of the image forming apparatus is individually and surely charged.

SUMMARY

An image forming system according to the present disclosure includes an image forming apparatus installed at a customer site, a management terminal device installed at the customer site, and a mobile terminal device of a guest user. The mobile terminal device (a) downloads and installs an application program including identification information, (b) presents the identification information to the management terminal device according to the application program, and (c) accepts a temporal ID corresponding to the identification information from the management terminal device. The management terminal device, (a) when the management terminal device accepts the identification information from the mobile terminal device, (a1) generates the temporal ID corresponding to the identification information and (a2) presents the generated temporal ID to the mobile terminal device and transmits the temporal ID to a user authentication device for the image forming apparatus to register the temporal ID as a user ID of the guest user and, (b) when payment of a usage fee for the image forming apparatus by the guest user is completed, (b1) deletes registration of the temporal ID of the guest user. The image forming apparatus (a) performs user authentication with the user authentication device when the guest user logs in to the image forming apparatus with the temporal ID and (b) issues an invoice containing the temporal ID and the usage fee when the guest user logs out of the image forming apparatus.

DETAILED DESCRIPTION

Embodiments of the present disclosure will be described below with reference to the drawings.

First Embodiment

Figure 1:
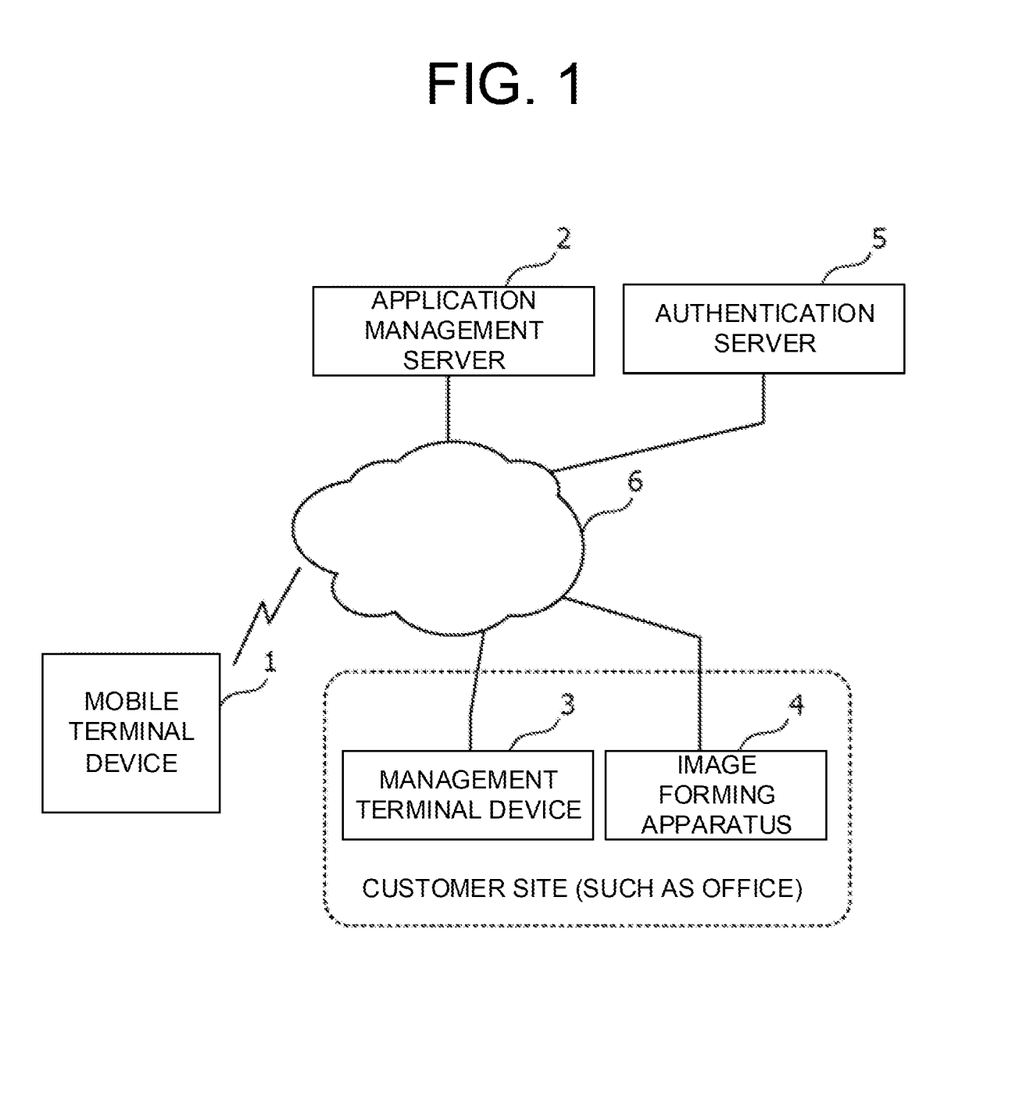
FIG. 1 is a block diagram showing a configuration of an image forming system according to an embodiment of the present disclosure.

FIG. 1 is a block diagram showing the configuration of an image forming system according to an embodiment of the disclosure. The system shown in FIG. 1 includes a mobile terminal device 1 of each guest user, an application management server 2, a management terminal device 3 installed at a customer site, an image forming apparatus 4 installed at the customer site, and an authentication server 5.

The image forming apparatus 4 is installed at a customer site such as an office, and is usually used by a registered user of the customer site. The guest user can temporarily use the image forming apparatus 4 when the guest user visits the customer site by carrying the mobile terminal device 1.

The mobile terminal device 1 is a small mobile terminal device such as a smart phone, and has a wireless network function and can be connected to a network 6, and has a short-range wireless communication function such as Bluetooth (registered trademark) and can communicate with the management terminal device 3. Although only one mobile terminal device 1 is illustrated in FIG. 1, the mobile terminal device 1, namely, the guest user may be two or more in number.

The application management server 2 is a server that provides an application program to the mobile terminal device 1.

The management terminal device 3 issues a temporal ID (i.e., a temporarily valid user ID) to the mobile terminal device 1 of the guest user, and registers and deletes the temporal ID in and from the authentication server 5.

The image forming apparatus 4 is a multifunction peripheral or the like, and executes various jobs with the above-described functions in accordance with a request from an operation panel (not shown), the mobile terminal device 1 or the like.

The authentication server 5 is connected to the network 6, and performs user authentication for the image forming apparatus 4 using, for example, an active directory.

The network 6 is a wide area network such as the Internet. The network 6 may be a local area network (LAN) or a network including a wide area network and a LAN connected thereto.

Figure 2:
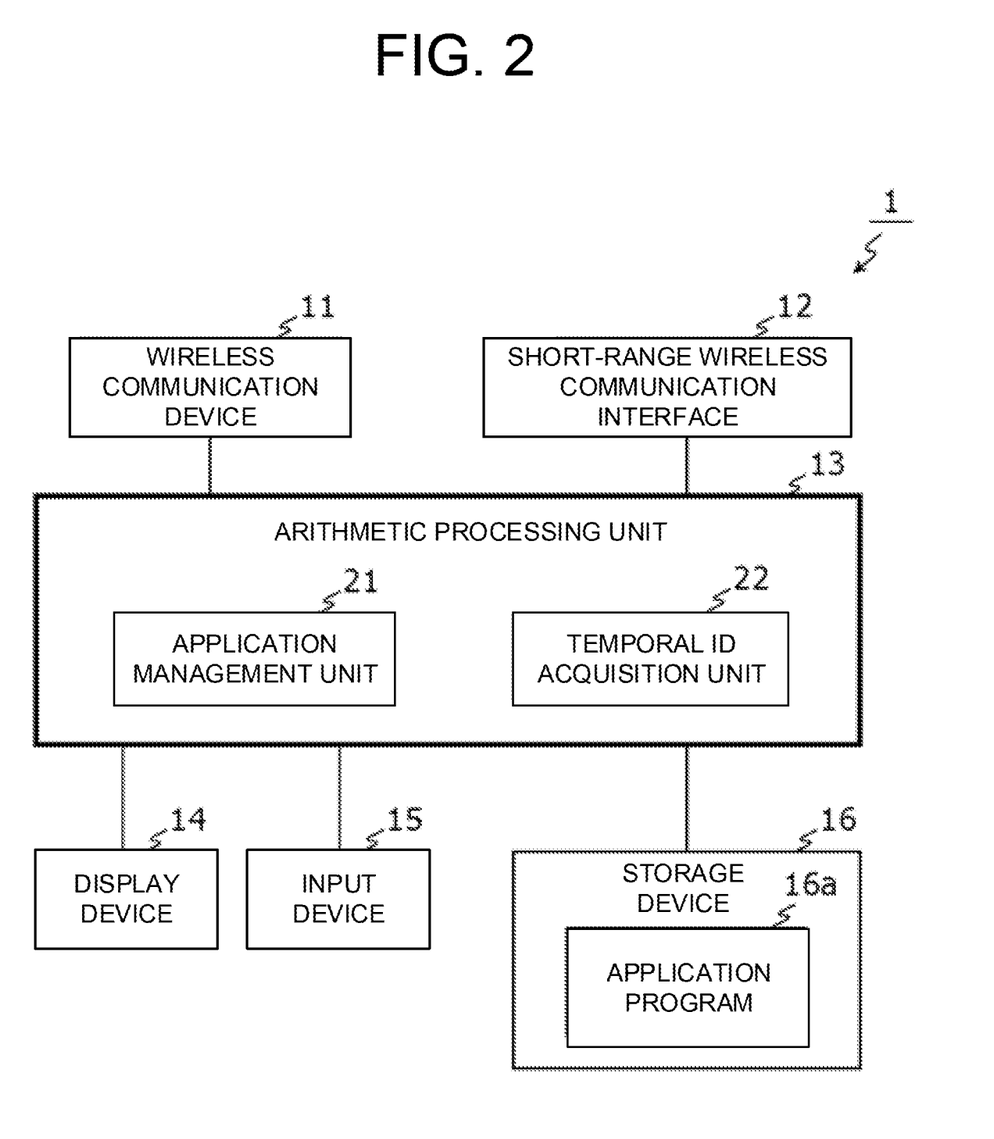
FIG. 2 is a block diagram showing a configuration of a mobile terminal device of the image forming system in FIG. 1.

FIG. 2 is a block diagram showing the configuration of the mobile terminal device 1 in FIG. 1. As shown in FIG. 2, the mobile terminal device 1 includes a wireless communication device 11, a short-range wireless communication interface 12, an arithmetic processing unit 13, a display device 14, an input device 15, and a storage device 16.

The wireless communication device 11 is a circuit connected to the network 6 through a wireless LAN and/or a cellular phone line.

The short-range wireless communication interface 12 is a circuit that wirelessly communicates with an interface of the same communication system existing at a relatively short range, for example, within a range of about 10 meters. In this first embodiment, Bluetooth (registered trademark) is used as the short-range wireless communication interface 12.

The arithmetic processing unit 13 includes, for example, a central processing unit (CPU), a read only memory (ROM), a random access memory (RAM), and the like as a computer, and operates as various processing units by loading programs stored in the ROM and the storage device 16 into the RAM and executing the programs in the CPU. Here, the arithmetic processing unit 13 operates as an application management unit 21, a temporal ID acquisition unit 22, and the like. In particular, the arithmetic processing unit 13 executes an application program 16a to operate as the temporal ID acquisition unit 22.

The application management unit 21 uses the wireless communication device 11 to access the application management server 2 through the network 6, and then downloads the application program 16a to install it in the mobile terminal device 1. The application management unit 21 is realized as an operating system, a web browser or the like.

The application program 16a includes identification information of the application program 16a.

The temporal ID acquisition unit 22 presents the identification information of the application program 16a to the management terminal device 3 according to the application program 16a, and accepts the temporal ID corresponding to the identification information from the management terminal device 3.

In the first embodiment, the identification information is one or more keywords designated by the guest user when downloading the application program 16a, and the temporal ID acquisition unit 22 uses the short-range wireless communication interface 12 to (a) transmit one or more keywords as the identification information of the application program 16a to the management terminal device 3 and (b) receive the temporal ID corresponding to the identification information from the management terminal device 3. The temporal ID is used when the guest user logs in to the image forming apparatus 4.

The display device 14 is, for example, a liquid crystal display or an indicator. The input device 15 is, for example, a touch panel or a key switch. The storage device 16 is a nonvolatile storage device such as a flash memory or a hard disk drive that stores programs, data, and the like.

Figure 3:
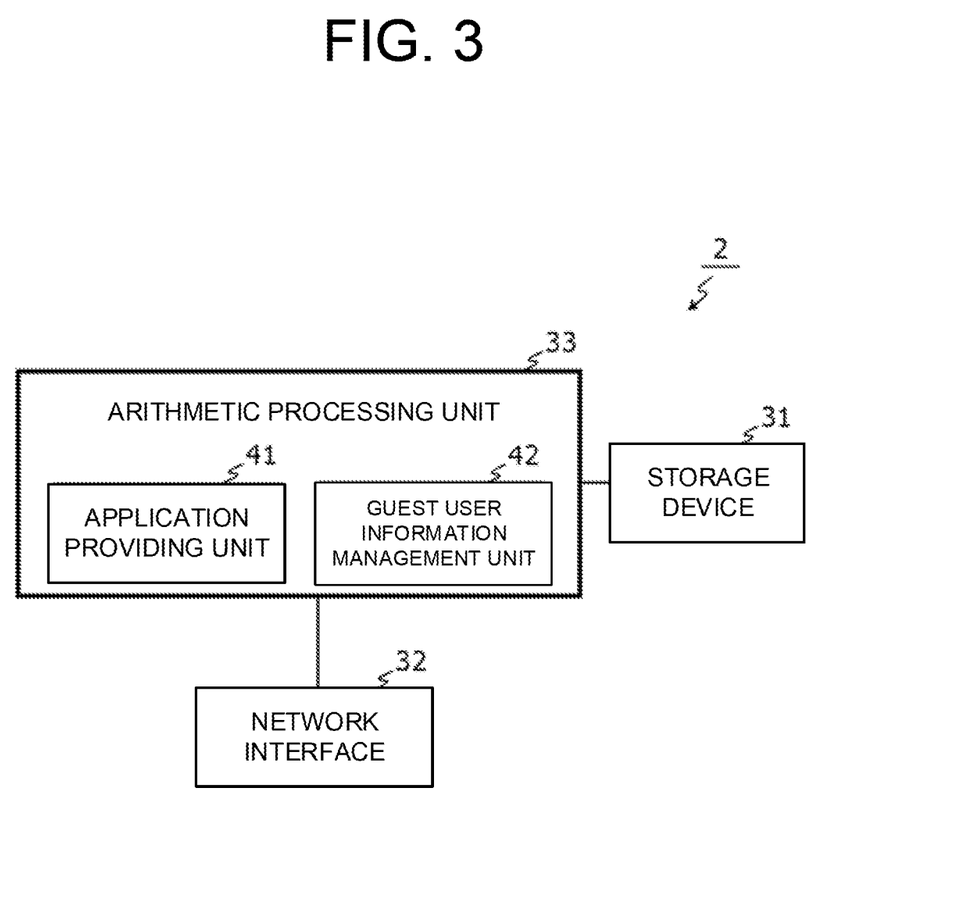
FIG. 3 is a block diagram showing a configuration of an application management server of the image forming system in FIG. 1.

FIG. 3 is a block diagram showing the configuration of the application management server 2 in FIG. 1. As shown in FIG. 3, the application management server 2 includes a storage device 31, a network interface 32, and an arithmetic processing unit 33.

The storage device 31 is a device for storing a server program and data. As the storage device 31, a nonvolatile semiconductor memory, a hard disk drive or the like is used. The storage device 31 stores the application program 16a downloaded by the mobile terminal device 1.

The network interface 32 is connected to the network 6 and performs data communication with other devices connected to the network 6, such as the mobile terminal device 1 and the management terminal device 3.

The arithmetic processing unit 33 includes, for example, a CPU, a ROM, a RAM, and the like as a computer, and operates as various processing units by loading programs stored in the ROM and the storage device 31 into the RAM and executing the programs in the CPU. Here, the arithmetic processing unit 33 operates as an application providing unit 41, a guest user information management unit 42, and the like.

The application providing unit 41 (a) receives a transmission request of the application program 16a from the mobile terminal device 1 using the network interface 32 and (b) includes identification information in the application program 16a designated by the transmission request and transmits the application program 16a to the mobile terminal device 1 using the network interface 32.

When the transmission request includes the guest user's personal information (name, date of birth, e-mail address, etc.), the guest user information management unit 42 stores the personal information as a log in the storage device 31 in association with the identification information of the application program 16a. For example, when an unauthorized use is detected, the name or the like of the guest user is specified on the basis of the personal information as necessary.

Figure 4:
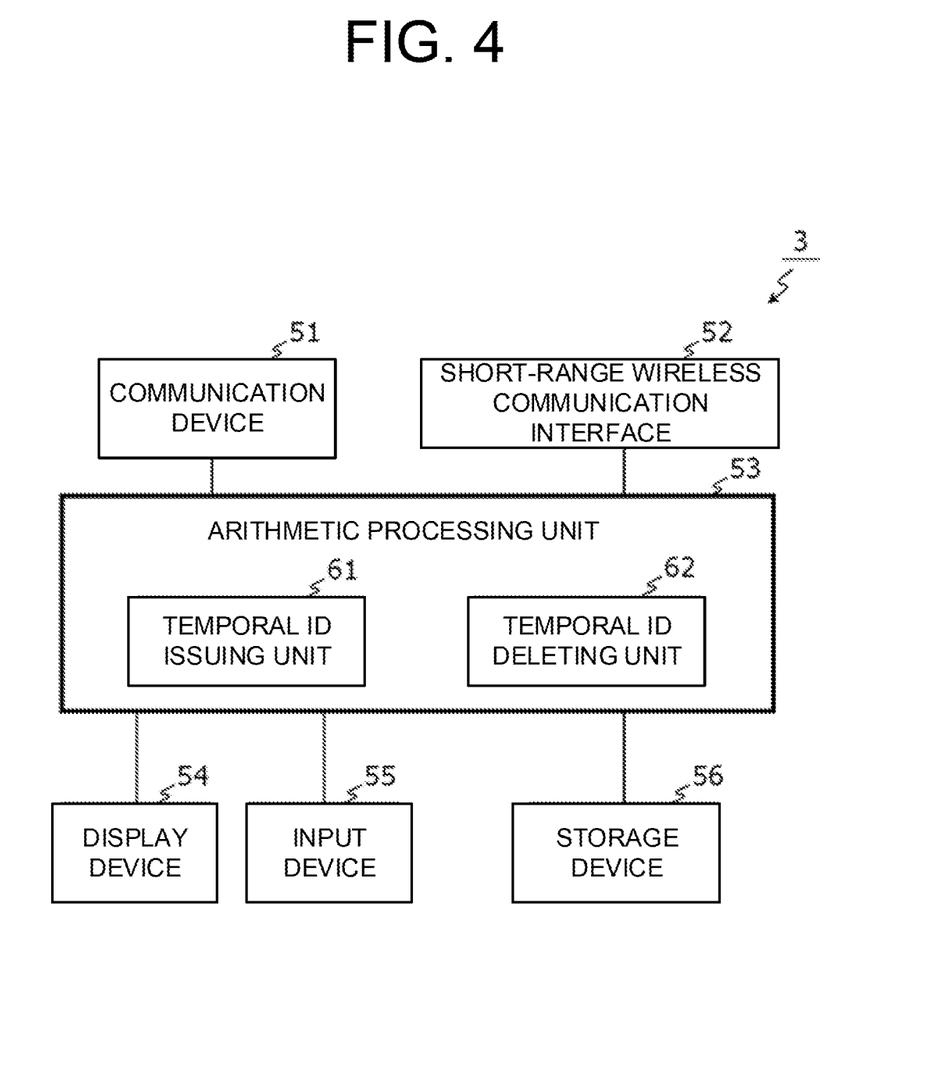
FIG. 4 is a block diagram showing a configuration of a management terminal device of the image forming system in FIG. 1.

FIG. 4 is a block diagram showing the configuration of the management terminal device 3 in FIG. 1. The management terminal device 3 is, for example, a personal computer. As shown in FIG. 4, the management terminal device 3 includes a communication device 51, a short-range wireless communication interface 52, an arithmetic processing unit 53, a display device 54, an input device 55, and a storage device 56.

The communication device 51 is a wired or wireless network interface or the like, and is a circuit connected to the network 6.

The short-range wireless communication interface 52 is a circuit that wirelessly communicates with an interface of the same communication system existing at a relatively short range. In the first embodiment, Bluetooth (registered trademark) is used as the short-range wireless communication interface 12.

The arithmetic processing unit 53 includes, for example, a CPU, a ROM, a RAM, and the like as a computer, and operates as various processing units by loading programs stored in the ROM and the storage device 56 into the RAM and executing the programs in the CPU. Here, the arithmetic processing unit 53 operates as a temporal ID issuing unit 61, a temporal ID deleting unit 62, and the like.

The temporal ID issuing unit 61, upon accepting identification information of the application program 16a from the mobile terminal device 1 using the short-range wireless communication interface 52, (a1) generates a temporal ID corresponding to the identification information and (a2) presents the generated temporal ID to the mobile terminal device 1 and transmits the temporal ID to a user authentication means (the authentication server 5 in this embodiment) for the image forming apparatus 4 to register the temporal ID as a user ID of the guest user. In this embodiment, the temporal ID issuing unit 61 (a) transmits a registration request of the temporal ID to the authentication server 5 using the communication device 51 and (b) transmits the generated temporal ID to the mobile terminal device 1 using the short-range wireless communication interface 52.

When the payment of the usage fee for the image forming apparatus 4 by the guest user is completed, the temporal ID deleting unit 62 deletes the registration of the temporal ID of the guest user. In this embodiment, the temporal ID deleting unit 62 transmits a request for deleting the temporal ID to the authentication server 5 using the communication device 51.

The image forming apparatus 4 includes an internal apparatus such as a printing apparatus and an image reading apparatus, and executes various jobs designated by a login user using the internal apparatus, and charges a usage fee to the login user. The user inputs a user ID (in the case of a guest user, a temporal ID) to a login screen displayed on the image forming apparatus 4. When the user authentication based on the user ID is successful, the image forming apparatus 4 allows the user to log in, and displays an operation screen such as a menu screen so that the image forming apparatus 4 can be used.

In addition, the image forming apparatus 4 (a) performs user authentication with the user authentication means (in this embodiment, the authentication server 5) when the guest user logs in to the image forming apparatus 4 with the temporal ID and (b) issues an invoice containing the temporal ID and the usage fee when the guest user logs out of the image forming apparatus 4. In this embodiment, the invoice is printed out, but may be displayed on the image forming apparatus 4 or the mobile terminal device 1.

In the first embodiment, the temporal ID acquisition unit 22 of the mobile terminal device 1 may display the one or more keywords described above on the display device 14, and the temporal ID issuing unit 61 of the management terminal device 3 may (a) receive the one or more keywords described above from the mobile terminal device 1 via the short-range wireless communication using the short-range wireless communication interface 52, (b1) optically read the one or more keywords displayed on the mobile terminal device 1 by an image capturing device or the like, (b2) determine whether the one or more keywords optically read and specified by a character recognition process or the like coincide with the one or more keywords received via the short-range wireless communication, and (b3) generate a temporal ID when the one or more keywords optically read and the one or more keywords received via the short-range wireless communication coincide, and present the temporal ID to the mobile terminal device 1, which has transmitted the one or more keywords via the short-range wireless communication, and generate no temporal IDs when the one or more keywords optically read and the one or more keywords received via the short-range wireless communication do not coincide.

Figure 5:
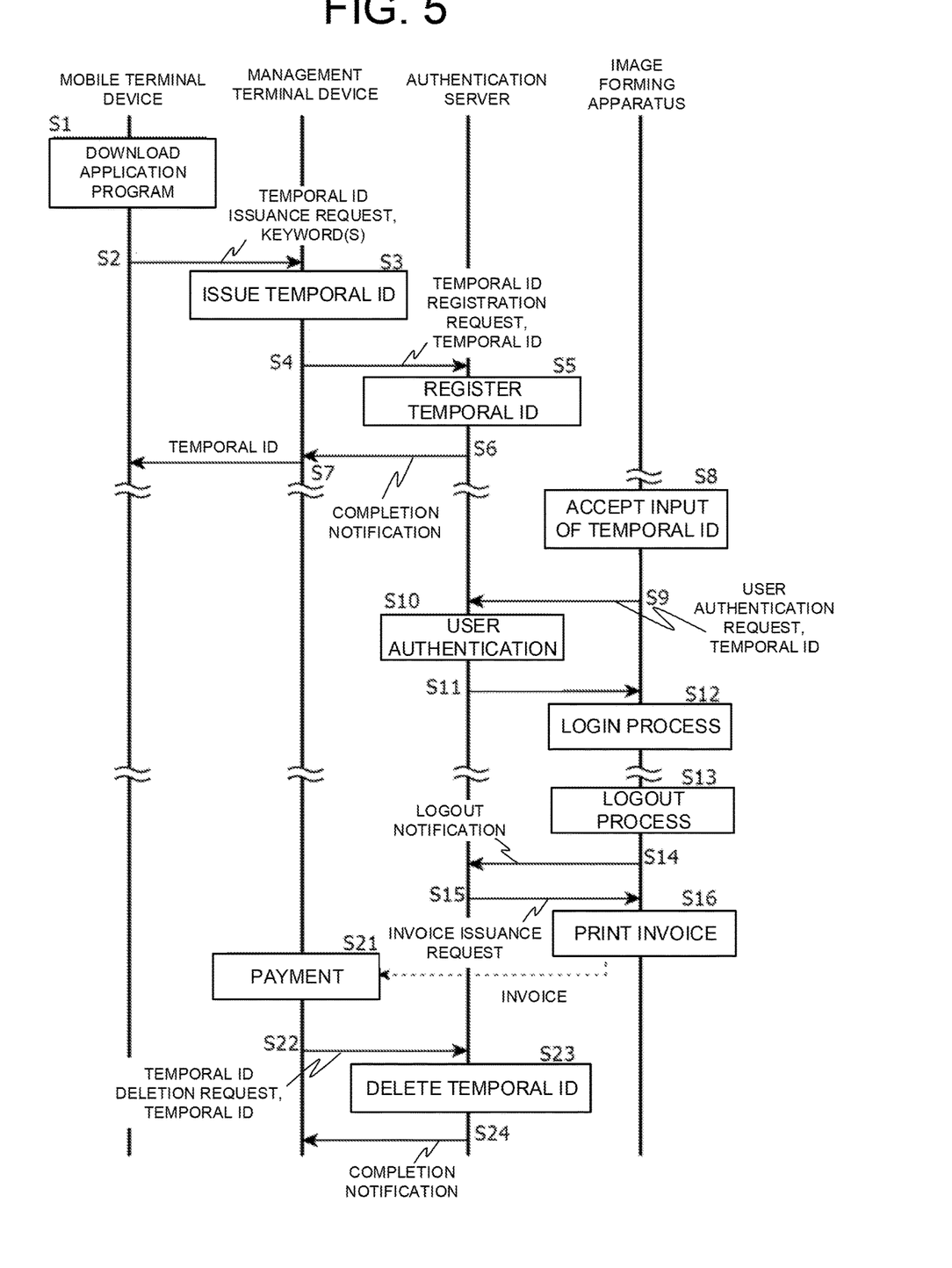
FIG. 5 is a sequence diagram for explaining an operation of an image forming system according to a first embodiment of the disclosure.

Next, the operation of the image forming system according to the first embodiment will be described. FIG. 5 is a sequence diagram illustrating the operation of the image forming system according to the first embodiment.

First, the user operates the mobile terminal device 1 to download and install the application program 16a. At this time, the mobile terminal device 1 transmits a transmission request of the application program 16a to the application management server 2 in accordance with a user operation, and receives and installs the application program 16a from the application management server 2 in step S1. In the first embodiment, the user inputs one or more arbitrary keywords to the mobile terminal device 1, the mobile terminal device 1 transmits the one or more keywords together with the transmission request of the application program 16a, and the application management server 2 transmits the application program 16a incorporating the one or more keywords to the mobile terminal device 1.

Thereafter, the user visits the customer site by carrying the mobile terminal device 1. When the application program 16a is executed in the mobile terminal device 1, the mobile terminal device 1 detects the management terminal device 3 via the short-range wireless communication, and transmits identification information (one or more keywords in the first embodiment) of the application program 16a to the management terminal device 3 together with a temporal ID issuance request via the short-range wireless communication (step S2).

On the other hand, the management terminal device 3, by detecting the mobile terminal device 1 via the short-range wireless communication, upon receiving the temporal ID issuance request and the identification information of the application program 16a (one or more keywords in the first embodiment), generates a temporal ID and holds it in association with the received identification information (one or more keywords in the first embodiment) (step S3). In the first embodiment, the management terminal device 3 generates a temporal ID without specifying the personal information (name, address, etc.) of the guest user.

At this time, the management terminal device 3 may generate a temporal ID without performing authentication of the keyword, or may perform authentication of the keyword and generate a temporal ID after successful authentication of the keyword. For example, authentication of the keyword is performed in a first method or a second method.

In the first method, the mobile terminal device 1 displays the keyword and, on the other hand, the management terminal device 3 displays the received keyword, and when the operator of the management terminal device 3 confirms that the keywords coincide and performs a predetermined operation, the management terminal device 3 generates a temporal ID in accordance with the operation.

Figure 6:
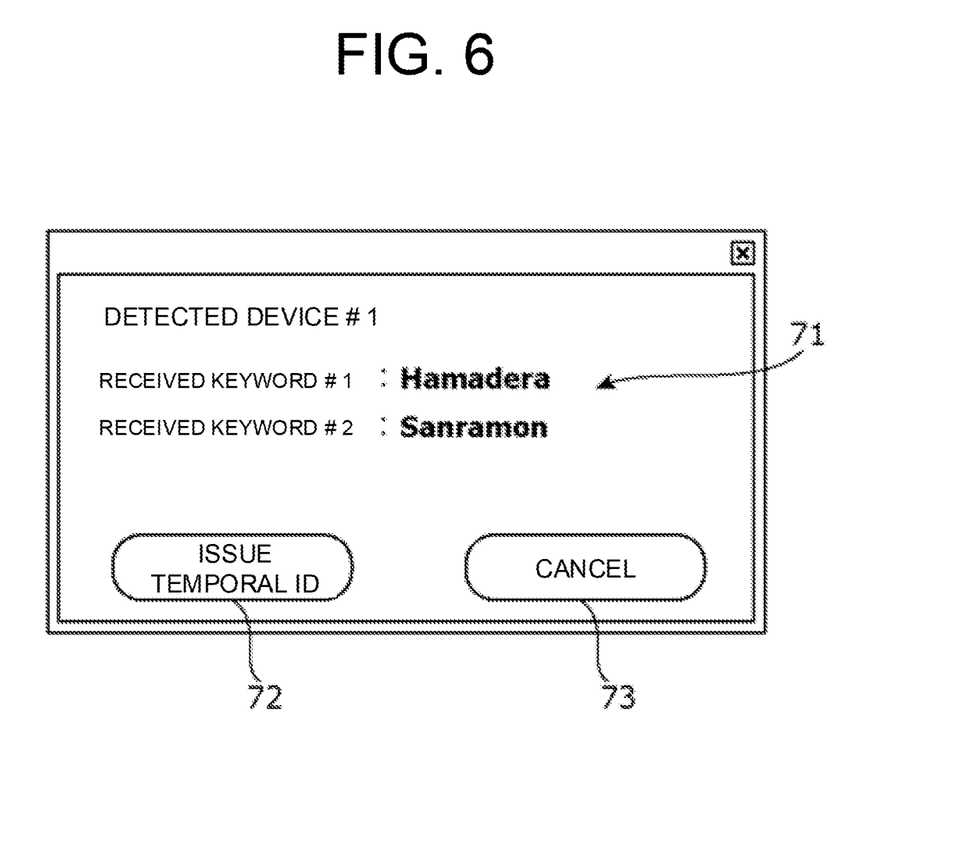
FIG. 6 is a diagram showing an example of an operation screen displayed on a management terminal device of the image forming system according to the first embodiment.

FIG. 6 is a diagram showing an example of an operation screen displayed on the management terminal device 3 according to the first embodiment. For example, as shown in FIG. 6, in the management terminal device 3, an operation screen including received keywords 71 (two keywords in the figure) is displayed, and when the operator presses a temporal ID issuing key 72, a temporal ID is generated, and when the operator presses a cancel key 73, no temporal IDs are generated.

In the second method, the mobile terminal device 1 displays the keyword and, on the other hand, the management terminal device 3 captures the keyword displayed on the mobile terminal device 1 with an image capturing device (not shown) in accordance with an operation of, for example, an operator (or a user of the mobile terminal device 1), and specifies the keyword in the captured image by a character recognition process or the like. The management terminal device 3 automatically generates a temporal ID when the captured keyword coincides with the received keyword. If the keywords do not coincide, no temporal IDs are generated.

When a temporal ID is generated, the management terminal device 3 transmits a registration request of the generated temporal ID and the temporal ID to the authentication server 5 in step S4.

Upon receiving the registration request and the temporal ID, the authentication server 5 registers the temporal ID in the user database as the user ID of the guest user (step S5), and transmits a completion notification to the management terminal device 3 (step S6).

After receiving the completion notification, the management terminal device 3 transmits the temporal ID to the mobile terminal device 1 in step S7. The mobile terminal device 1 holds the temporal ID and displays it to the guest user. The user visually recognizes the displayed temporal ID.

Thereafter, the user inputs the temporal ID when logging in to the image forming apparatus 4. Upon accepting the input of the temporal ID on the login screen (step S8), the image forming apparatus 4 sends a user authentication request and the temporal ID to the authentication server 5 (step S9).

Upon receiving the user authentication request and the temporal ID, the authentication server 5 refers to the user database to determine whether or not the temporal ID is valid (that is to say, coincides with the ID as registered in the user database) (step S10), and transmits the determination result as the authentication result to the image forming apparatus 4 (step S11).

The image forming apparatus 4 receives the authentication result, and if the authentication result indicates the success of user authentication, performs a login process (step S12). In the login process, a menu screen for executing various jobs and the like is displayed, and a usage fee count for the temporal ID is started. That is, the usage fee is counted for each job executed after the login process, and the usage fee is collectively charged to the temporal ID at the time of logout. In this embodiment, when each of the jobs (A4 monochrome copying, A4 color copying, etc.) is completed, the image forming apparatus 4 transmits the temporal ID as well as the job type and the counter information indicating the number of pages or the number of sheets to the authentication server 5, and the authentication server 5 calculates the usage fee for each temporal ID based on the job type and the counter information and generates the charging information.

Thereafter, when the guest user terminates the use of the image forming apparatus 4 and performs a logout operation, the image forming apparatus 4 executes a logout process (step S13), and transmits a logout notification to the authentication server 5 (step S14). In the logout process, the display of the operation screen such as the menu screen is terminated, the login screen is displayed, and the above-mentioned usage fees are summed up.

The authentication server 5, upon receiving the logout notification (step S14), sends an invoice issuance request together with the above-mentioned charging information to the image forming apparatus 4 (step S15). Upon receiving the invoice issuance request and the charging information, the image forming apparatus 4 prints out an invoice with the temporal ID, the identification information (one or more keywords), the charging amount based on the charging information, and the like entered therein (step S16).

Then, the guest user pays the amount entered in the printed invoice at a cash counter, a coin vendor or the like.

The management terminal device 3, upon detecting the payment of the amount entered in the invoice based on the operation of the operator or the notification from the coin vendor (step S21), sends a temporal ID corresponding to the invoice and a temporal ID deletion request to the authentication server 5 (step S22).

Upon receiving the temporal ID deletion request and the temporal ID, the authentication server 5 deletes the temporal ID from the user database (step S23), and transmits a completion notification to the management terminal device 3 (step S24).

As described above, according to the first embodiment, the management terminal device 3 and the image forming apparatus 4 are installed at the customer site, and the guest user who visits the customer site carries the mobile terminal device 1. Then, the mobile terminal device 1 (a) downloads and installs an application program including identification information, (b) presents the identification information to the management terminal device 3 according to the application program, and (c) accepts a temporal ID corresponding to the identification information from the management terminal device 3. The management terminal device 3, (a) when the management terminal device 3 accepts the identification information from the mobile terminal device 1, (a1) generates a temporal ID corresponding to the identification information and (a2) presents the generated temporal ID to the mobile terminal device 1 and transmits the temporal ID to a user authentication means for the image forming apparatus 4 to register the temporal ID as the user ID of the guest user and, (b) when the payment of the usage fee for the image forming apparatus 4 by the guest user is completed, (b1) deletes the registration of the temporal ID of the guest user. The image forming apparatus 4 (a) performs user authentication with the user authentication means when the guest user logs in to the image forming apparatus 4 with the temporal ID, and (b) issues an invoice containing the temporal ID and the usage fee when the guest user logs out of the image forming apparatus 4.

As a result, since each guest user is identified by the temporal ID, the guest user who uses the image forming apparatus installed at the customer site of the image forming apparatus is charged individually and surely.

Second Embodiment

In an image forming system according to a second embodiment of the disclosure, a visible code (a bar code, a two-dimensional code or the like) unique to the application program 16a and a unique identifier are used as the above-mentioned identification information. In the second embodiment, the mobile terminal device 1 displays the visible code on the display device 14 and transmits the unique identifier to the management terminal device 3 through the short-range wireless communication interface 12, while the management terminal device 3 (a) optically reads the visible code displayed on the mobile terminal device 1 with an image capturing device and receives the unique identifier via the short-range wireless communication through the short-range wireless communication interface 52 and (b) determines whether or not the read visible code and the unique identifier are valid, generates a temporal ID when the read visible code and the unique identifier are valid, and transmits the temporal ID to the mobile terminal device 1, which has transmitted the unique identifier, via the short-range wireless communication through the short-range wireless communication interface 52.

Specifically, for example, the management terminal device 3 decodes the visible code to acquire user information, inquires of the application management server 2 to determine whether or not the user information is valid, and determines whether or not the visible code is valid based on the determination result. The management terminal device 3 inquires of the application management server 2 whether the combination of the visible code and the unique identifier is valid or not, and determines whether the unique identifier is valid or not. The management terminal device 3 may encode the unique identifier together with the user information in the visible code, and determine whether or not the unique identifier obtained by decoding the visible code coincides with the received unique identifier to determine whether or not the unique identifier is valid.

Figure 7:
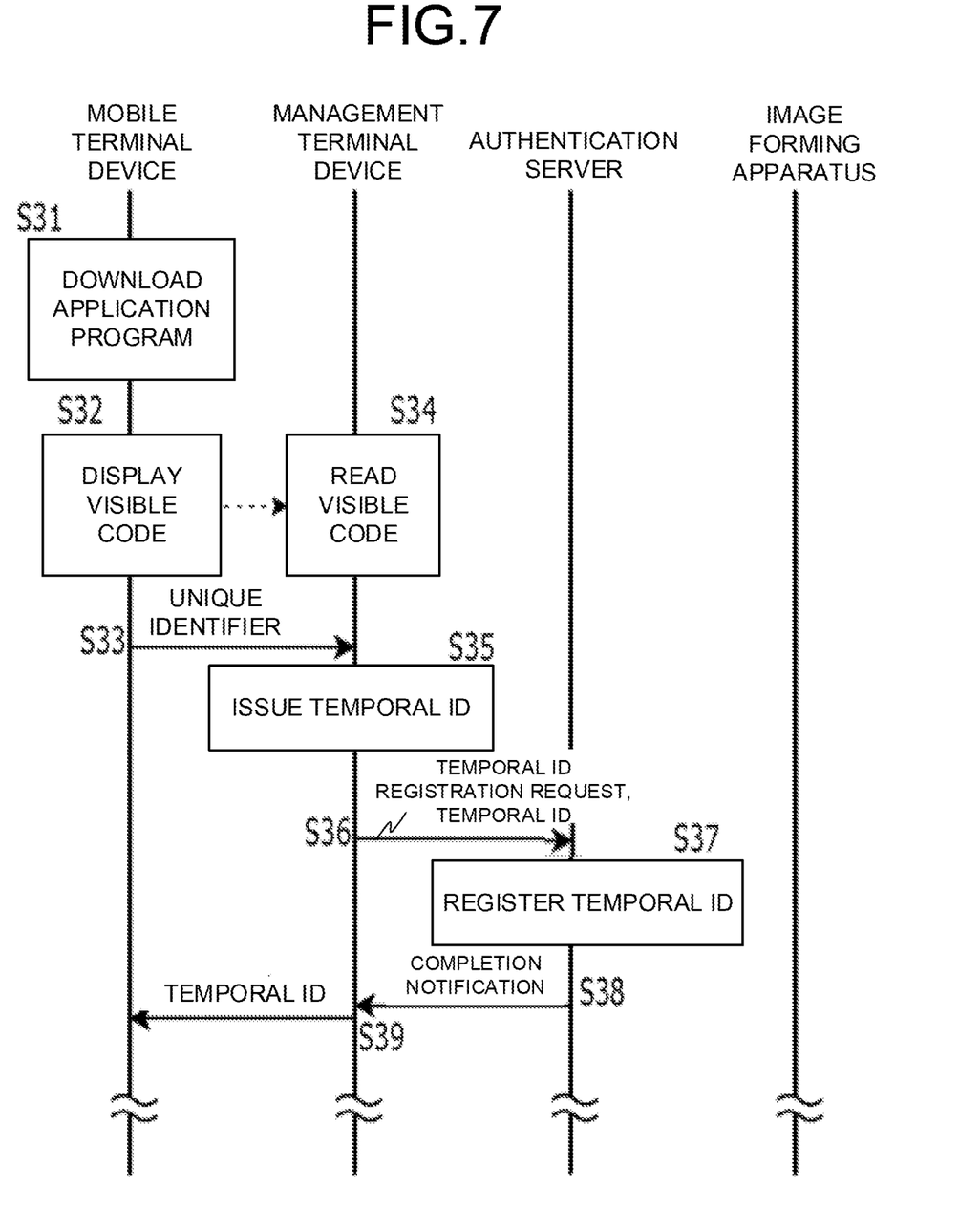
FIG. 7 is a sequence diagram for explaining an operation of an image forming system according to a second embodiment of the disclosure.

Next, the operation of the image forming system according to the second embodiment will be described. FIG. 7 is a sequence diagram illustrating the operation of the image forming system according to the second embodiment.

In the second embodiment, the guest user inputs personal information (name, date of birth, e-mail address, etc.) of the guest user to the mobile terminal device 1, the mobile terminal device 1 transmits the user information together with a transmission request of the application program 16*a*, and the application management server 2, upon accepting the user information, generates and transmits to the mobile terminal device 1 an application program 16*a* incorporating a unique visible code and a unique identifier unique to the application program 16*a*, and stores the personal information as a log in association with the visible code and the unique identifier.

After the application program 16*a* is downloaded and installed in the mobile terminal device 1 in step S31, the user visits the customer site by carrying the mobile terminal device 1. When the application program 16*a* is executed in the mobile terminal device 1, the mobile terminal device 1 displays the visible code, detects the management terminal device 3 via the short-range wireless communication, and transmits the unique identifier of the application program 16*a* to the management terminal device 3 via the short-range wireless communication in step S33.

On the other hand, the management terminal device 3 captures and decodes the visible code with an image capturing device (not shown) (step S34), receives the unique identifier, performs authentication of the visible code and the unique identifier as described above, and when the authentication succeeds, generates a temporal ID, and holds the temporal ID in association with the received identification information (the visible code and the unique identifier in the second embodiment) (step S35).

When a temporal ID is generated, the management terminal device 3 transmits a registration request of the generated temporal ID and the temporal ID to the authentication server 5 in step S36.

Upon receiving the registration request and the temporal ID, the authentication server 5 registers the temporal ID in the user database as the user ID of the guest user (step S37), and transmits a completion notification to the management terminal device 3 (step S38).

After receiving the completion notification, the management terminal device 3 transmits the temporal ID to the mobile terminal device 1 in step S39. The mobile terminal device 1 holds the temporal ID and displays it to the guest user.

Other configurations and operations of the image forming system according to the second embodiment are the same as those of the first embodiment, and therefore description thereof is omitted.

Various changes and modifications to the embodiments described above will be apparent to those skilled in the art. Such changes and modifications may be made without departing from the spirit and scope of the subject matter and without diminishing intended advantages. It is therefore intended that such changes and modifications be included within the scope of the appended claims.

For example, in the first and second embodiments, the management terminal device 3 may (a) receive the identification information from the mobile terminal device 1 via the short-range wireless communication, and (b) when the mobile terminal device 1 is no longer detected via the short-range wireless communication before the payment of the usage fee for the image forming apparatus 4 by the guest user is completed, display a warning message, for example, to inform the administrator of the unauthorized use by the guest user.

In the first and second embodiments, the authentication server 5 is provided as a user authentication means for the image forming apparatus 4, but instead, the image forming apparatus 4 may incorporate the user authentication means therein to perform local user authentication.

In the first and second embodiments, (a) the mobile terminal device 1 may register a unique visible code (such as a bar code) in the authentication server 5 in association with the temporal ID according to the application program 16*a*, (b) the authentication server 5 may acquire the charging information such as the above-mentioned usage fee corresponding to the temporal ID from the image forming apparatus 4, associate the charging information corresponding to the temporal ID with the above-mentioned unique visible code, and notify the image forming apparatus 4 of the unique visible code, (c) the image forming apparatus 4 may include the unique visible code in the above-mentioned invoice, and (d) the management terminal device 3 may read the unique visible code from the invoice, which the guest user brought to the cash counter, with the image capturing device, acquire the charging information corresponding to the unique visible code from the authentication server 5, and performs charging to the guest user with a point of sale (POS) system or a cash register on the basis of the charging information to make the payment completed.

In the first and second embodiments, the management terminal device 3 may specify the mobile terminal device 1, in which the application program 16*a* including identification information corresponding to the generated temporal ID is installed, via the short-range wireless communication, and present the generated temporal ID to the specified mobile terminal device 1.

In the first and second embodiments, the invoice may further contain the function used by the guest user and the number of pages processed by the function (e.g., four color copies) together with the usage fee.

What is claimed is:

1. An image forming system comprising:
    an image forming apparatus installed at a customer site;
    a management terminal device installed at the customer site; and
    a mobile terminal device of a guest user,
    wherein the mobile terminal device (a) downloads and installs an application program including identification information, (b) presents the identification information to the management terminal device according to the application program, and (c) accepts a temporal ID corresponding to the identification information from the management terminal device,
    wherein the management terminal device, (a) when the management terminal device accepts the identification information from the mobile terminal device, (a1) generates the temporal ID corresponding to the identification information and (a2) presents the mobile terminal device with the temporal ID generated and transmits the temporal ID to a user authentication device for the image forming apparatus to register the temporal ID as a user ID of the guest user and, (b) when payment of a usage fee for the image forming apparatus by the guest user is completed, (b1) deletes registration of the temporal ID of the guest user, and wherein the image forming apparatus (a) performs user authentication with the user authentication device when the guest user logs in to the image forming apparatus with the temporal ID and (b) issues an invoice containing the temporal ID and the usage fee when the guest user logs out of the image forming apparatus.

2. The image forming system according to claim 1, wherein the identification information includes one or more keywords designated by the guest user when the application program is downloaded, wherein the mobile terminal device displays the one or more keywords, and wherein the management terminal device (a) receives the one or more keywords from the mobile terminal device via short-range wireless communication, (b1) optically reads the one or more keywords displayed on the mobile terminal device, (b2) determines whether the one or more keywords optically read coincide with the one or more keywords received via the short-range wireless communication, and (b3) generates the temporal ID and presents the temporal ID to the mobile terminal device that has transmitted the one or more keywords via the short-range wireless communication when the one or more keywords optically read coincide with the one or more keywords received via the short-range wireless communication, and does not generate the temporal ID when the one or more keywords optically read do not coincide with the one or more keywords received via the short-range wireless communication.

3. The image forming system according to claim 2, wherein the management terminal device generates the temporal ID without specifying personal information of the guest user.

4. The image forming system according to claim 1, wherein the identification information includes a visible code and a unique identifier unique to the application program, and wherein the management terminal device (a) optically reads the visible code displayed on the mobile terminal device and receives the unique identifier via the short-range wireless communication and (b) determines whether the visible code read and the unique identifier are valid and, when the visible code read and the unique identifier are valid, generates the temporal ID and transmits the temporal ID to the mobile terminal device, which has transmitted the unique identifier, via the short-range wireless communication.

5. The image forming system according to claim 1, wherein the management terminal device (a) receives the identification information from the mobile terminal device via the short-range wireless communication and (b) notifies an unauthorized use by the guest user when the mobile terminal device is no longer detected via the short-range wireless communication before the payment of the usage fee for the image forming apparatus by the guest user is completed.

6. The image forming system according to claim 1, wherein the management terminal device specifies the mobile terminal device, in which the application program including the identification information is installed, via the short-range wireless communication and presents the mobile terminal device specified with the temporal ID generated.

7. The image forming system according to claim 1, wherein the invoice further contains a function used by the guest user and a number of pages processed by the function, along with the usage fee.

* * * * *